US011591552B2

(12) United States Patent
Vitiello et al.

(10) Patent No.: US 11,591,552 B2
(45) Date of Patent: Feb. 28, 2023

(54) WATER-SOLUBLE UNIT DOSE ARTICLE COMPRISING A WATER-SOLUBLE FILM COMPRISING A POLYVINYL ALCOHOL POLYMER COMPRISING AN ANIONIC MONOMER UNIT

(71) Applicants: Luca Vitiello, Brussels (BE); Florence Catherine Courchay, Brussels (BE); Robby Renilde Francois Keuleers, Lippelo (BE); Miguel Brandt Sanz, Tervuren (BE); Regine Labeque, Neder over Heembeek (BE)

(72) Inventors: Luca Vitiello, Brussels (BE); Florence Catherine Courchay, Brussels (BE); Robby Renilde Francois Keuleers, Lippelo (BE); Miguel Brandt Sanz, Tervuren (BE); Regine Labeque, Neder over Heembeek (BE)

(73) Assignee: The Procter & Gamble Company, Cincinnati, OH (US)

( * ) Notice: Subject to any disclaimer, the term of this patent is extended or adjusted under 35 U.S.C. 154(b) by 364 days.

(21) Appl. No.: 16/872,514

(22) Filed: May 12, 2020

(65) Prior Publication Data
US 2020/0362275 A1    Nov. 19, 2020

(30) Foreign Application Priority Data
May 17, 2019   (EP) ..................... 19175125

(51) Int. Cl.
| | | |
|---|---|---|
| *C11D 17/04* | (2006.01) | |
| *C08L 29/04* | (2006.01) | |
| *B65B 9/08* | (2012.01) | |
| *C08F 218/08* | (2006.01) | |
| *C08F 220/14* | (2006.01) | |
| *C08F 216/06* | (2006.01) | |

(52) U.S. Cl.
CPC .............. *C11D 17/042* (2013.01); *B65B 9/08* (2013.01); *C08F 216/06* (2013.01); *C08F 218/08* (2013.01); *C08F 220/14* (2013.01); *C08L 29/04* (2013.01)

(58) Field of Classification Search
CPC ......... C11D 17/042; C08L 29/04; B65B 9/08; C08F 218/08; C08F 220/14; C08F 216/06
USPC ....................................................... 510/439
See application file for complete search history.

(56) References Cited

U.S. PATENT DOCUMENTS

| | | |
|---|---|---|
| 10,513,588 B2 | 12/2019 | Friedrich |
| 2015/0275154 A1 | 10/2015 | Souter et al. |
| 2015/0360837 A1 | 12/2015 | Perez-prat Vinuesa et al. |
| 2016/0040105 A1 | 2/2016 | Depoot |
| 2016/0102278 A1 | 4/2016 | Labeque et al. |

(Continued)

FOREIGN PATENT DOCUMENTS

WO    2017184606 A8    10/2018

OTHER PUBLICATIONS

CM5091F EP Search Report for application No. 19175119.7-1105, dated Nov. 6, 2019, 7 pages.

(Continued)

*Primary Examiner* — Michael M. Bernshteyn
(74) *Attorney, Agent, or Firm* — Gregory S. Darley-Emerson; Andrew J. Mueller (57) ABSTRACT

Multicompartment water-soluble unit dose articles and methods of making them.

18 Claims, 1 Drawing Sheet

(56) References Cited

U.S. PATENT DOCUMENTS

| | | | |
|---|---|---|---|
| 2017/0233539 A1* | 8/2017 | Friedrich | ............... C08L 29/04 |
| | | | 510/296 |
| 2019/0337650 A1* | 11/2019 | Johnson | ................... B65B 1/04 |
| 2020/0102434 A1 | 4/2020 | Friedrich | |
| 2020/0362276 A1 | 11/2020 | Vitiello et al. | |

OTHER PUBLICATIONS

All Office Actions; U.S. Appl. No. 16/872,492, filed May 12, 2020.
EP Extended European Search Report and Search Opinion; Application No. 19175125.4; dated Nov. 7, 2019; 07 pages.
PCT Search Report for appl. No. PCT/US2020/070046, dated Aug. 3, 2020, 14 pages.
PCT Search Report for appl. No. PCT/US2020/070047, dated Aug. 3, 2020, 15 pages.
U.S. Appl. No. 16/872,492, filed May 12, 2020, Luca Vitiello.

* cited by examiner

WATER-SOLUBLE UNIT DOSE ARTICLE COMPRISING A WATER-SOLUBLE FILM COMPRISING A POLYVINYL ALCOHOL POLYMER COMPRISING AN ANIONIC MONOMER UNIT

FIELD OF THE INVENTION

Multicompartment water-soluble unit dose articles and methods of making them.

BACKGROUND OF THE INVENTION

Water-soluble unit dose articles are preferred by consumers. Such articles comprise water-soluble films defining internal compartments, and treatment compositions, such as detergent compositions, are contained within the compartments. Most preferred are 'superposed' water-soluble unit dose articles, in which at least a first compartment is arranged above another compartment. Such superposed unit dose articles are preferred by consumers due to their compacted shape.

It is possible to make superposed unit dose articles using 1 single water-soluble film. Such unit dose articles are described in WO2018129124. They have benefit of using less water-soluble film during manufacture as there is less trimmed excess film. Without wishing to be bound by theory, such unit dose articles are made by multiple folding of the single water-soluble film upon itself to create at least 3 layers of film. A first compartment is defined between the first and second layer, and then a second compartment between the second and third layer, meaning the first and second compartments are separated by one film layer and three layers of film are sealed together in the seal area. Alternatively, a first composition is defined between a first and a second film layer to create a first compartment, and a second composition is defined between a third and a fourth film layer to create a second compartment. The superposed unit dose article is hence created through folding the first compartment over the second compartment, meaning the first and second compartments are separated by two layers of film and four layers of film are sealed together in the seal area. Further variations of this folding process could yield multi-compartment layer pouches, each compartment separated from each other by at least one film layer, and at least 3 film layers being sealed together within the seal area.

However, an issue encountered with single film unit dose articles is the fact that some regions of the unit dose article require 3 or more film layers to be sealed together. An issue is that 3 or more film layer seal regions can experience dissolution challenges in water due to the presence of higher concentration of film. This can result in undissolved film residue in the wash liquor which can stick to fabrics or articles being washed.

Therefore, there is a need in the art for a superposed multi-compartment water-soluble unit dose article comprising a single water-soluble film that is folded upon itself and that exhibits reduced instances of undissolved film residue.

It was surprisingly found that superposed multi-compartment water-soluble unit dose articles comprising a single water-soluble film comprising a polyvinyl alcohol based copolymer having at least one anionic monomer unit provided such benefit.

SUMMARY OF THE INVENTION

A first aspect of the present invention is a multicompartment water-soluble unit dose article comprising a treatment composition and comprising a single water-soluble film, wherein the single water-soluble film comprises a first polyvinyl alcohol copolymer wherein said first polyvinyl alcohol copolymer comprises a first anionic monomer unit, a vinyl alcohol monomer unit, and optionally a vinyl acetate monomer unit, wherein said anionic monomer unit comprises an anionic moiety, and wherein the single water-soluble film is folded upon itself to create at least a first film layer, a second film layer and a third film layer; and wherein at least a first internal compartment and a second internal compartment are formed between said layers; and wherein the multicompartment water-soluble unit dose article comprises at least one seal region in which the first film layer, the second film layer and the third film layer are all sealed to one another, and wherein the first internal compartment is positioned above the second internal compartment in a superposed orientation and the first internal compartment and second internal compartment are separated from one another by at least one water-soluble film layer.

A second aspect of the present invention is a process for making a water-soluble unit dose article according to the present invention comprising the steps of;
 a. Moving the single water-soluble film in a first direction;
 b. Deforming a first part of the water-soluble film to create a first open compartment comprising a first film layer;
 c. Filling the first open compartment with a treatment composition;
 d. Folding a second part of the water-soluble film in a second direction, wherein the second direction is perpendicular to the first direction, to create a second film layer which closes the open compartment to create a first closed compartment;
 e. Sealing the first and second film layers;
 f. Deforming a third part of the water-soluble film to create a second open compartment, wherein the second open compartment is positioned adjacent to the first closed compartment in the second direction;
 g. Filling the second open compartment with a treatment composition;
 h. Folding the water-soluble film in the second direction so that the first closed compartment is folded to close the second open compartment creating a third film layer;
 i. Sealing the third film layer to the sealed first and second film layers to create the water-soluble unit dose article.
wherein each of steps a-i happen sequentially, or wherein steps f and b happen simultaneously and steps c and g happen simultaneously, or wherein step f happens before step b and step g happens before step c, or a combination thereof.

A third aspect of the present invention is a process for making a water-soluble unit dose article according to the present invention comprising the steps of;
 a. Moving the water-soluble film in a first direction;
 b. Deforming a first part of the water-soluble film to create a first open compartment comprising a first film layer;
 c. Filling the first open compartment with a treatment composition;
 d. Folding a second part of the water-soluble film in a second direction, wherein the second direction is perpendicular to the first direction, to create a second film layer which closes the open compartment to create a first closed compartment;
 e. Sealing the first and second film layers together;
 f. Deforming a third part of the water-soluble film to create a second open compartment comprising a third film layer, wherein the second open compartment is positioned adjacent to the first closed compartment in the second direction;

g. Filling the second open compartment with a treatment composition;

h. Folding a fourth part of the water-soluble film in a third direction, wherein the third direction is opposite to the first direction to create a fourth film layer which closes the open second compartment to a create a second closed compartment;

i. Sealing the third and fourth film layers together;

j. Folding the water-soluble film in the second direction or the third direction so that the first and second closed compartments are positioned so that the first and second closed compartments are in superposed orientation to one another;

k. Sealing the sealed third and fourth film layers to the sealed first and second film layers to create the water-soluble unit dose article, wherein steps a-k can happen sequentially, or wherein steps b-e and f-i may occur simultaneously to one another, or where steps f-i occur before steps b-e, or a mixture thereof.

DETAILED DESCRIPTION OF THE INVENTION

Multicompartment Water-Soluble Unit Dose Article

The present invention relates to a multicompartment water-soluble unit dose article. Without wishing to be bound by theory, a water-soluble unit dose article is designed to be a single use dose of a treatment composition enclosed in a water-soluble film. Upon addition to water, the film disintegrates and/or dissolves releasing the internal treatment composition into the surrounding water. The treatment composition is described in more detail below.

The multicompartment water-soluble unit dose article comprises a single water-soluble film, wherein the single water-soluble film comprises a first polyvinyl alcohol copolymer wherein said first polyvinyl alcohol copolymer comprises a first anionic monomer unit, a vinyl alcohol monomer unit, and optionally a vinyl acetate monomer unit, wherein said anionic monomer unit comprises an anionic moiety. By 'single water-soluble film' we herein mean that a single water-soluble film is folded such that it creates multiple layers atop one another to create the superposed unit dose article. It does not mean the unit dose article is made from multiple starting films where each film has the same film chemistry. The water-soluble film is described in more detail below.

The single water-soluble film is folded upon itself to create at least a first film layer, a second film layer and a third film layer. A first internal compartment and a second internal compartment are formed between said layers.

The multicompartment water-soluble unit dose article comprises at least one seal region in which the first film layer, the second film layer and the third film layer are all sealed to one another. The seal region should be understood to mean an area in which at least a first film layer and a second film layer are sealed together. The seal region comprises at least one area in which at least the first water-soluble film layer, the second water-soluble film layer and the third water-soluble film layer are sealed together, in other words, all three film layers are sealed to one another. The seal region may comprise a flange region. The flange region is composed of excess sealed film material and is present on the outside of the unit dose article. Preferably, the seal region comprises a flange region wherein the first water-soluble film layer, the second water-soluble film layer and the third water-soluble film layer are at least partially sealed together in the flange region. In other words, the flange region may comprise areas in which all 3 film layers are sealed together and areas wherein less than 3 film layers are sealed together. Alternatively, the whole of the flange region may comprise at least the first water-soluble film layer, the second water-soluble film layer and the third water-soluble film layer sealed together.

Without wishing to be bound by theory, a mixture of sealed and non-sealed areas can be achieved in the flange region by, for example, applying small localized areas of solvent, whilst leaving other areas solvent free.

Preferably, the water-soluble film layers are sealed together via solvent sealing, heat sealing or a mixture thereof. More preferably the water-soluble film layers are sealed together using solvent sealing, most preferably each water-soluble film layer is sealed to one or more of the other water-soluble film layers using solvent sealing. Preferably when solvent sealing, the solvent comprises water, more preferably the solvent consists of >99% by weight of the solvent of water.

The water-soluble film layers define at least a first internal compartment and a second internal compartment wherein the first internal compartment is positioned above the second internal compartment in a superposed orientation, in other words, one compartment positioned on top of another as opposed to side-by-side. In such an orientation, the two internal compartments are separated from one another by at least one film layer.

The water-soluble unit dose article may comprise at least three, preferably at least four internal compartments.

At least one, or even at least two, or even at least three internal compartments may be formed between the first film layer and the second film layer arranged in side-by-side orientation. At least one, or even at least two, or even at least three internal compartments may be formed between the second film layer and the third film layer arranged in side-by-side orientation.

Preferably, a first internal compartment is formed between the first film layer and the second film layer, and second and third internal compartments are formed between the second and third film layers. This results in a superposed unit dose article having two internal compartments positioned side-by-side to one another and superposed onto a third internal compartment.

The water-soluble unit dose article may comprise a fourth film layer. Preferably the first film layer, the second film layer, the third film layer and the fourth film layers are sealed together in the seal region creating a dual compartment layered water soluble unit dose article. One or more internal compartments may be formed between the third film layer and the fourth film layer. In addition, one or more internal compartments may be formed between the second film layer and the first film layer, the one or more internal compartments positioned between the third and the fourth film layer being superposed on the one or more internal compartments positioned between the first and second film layer and as such being separated by two film layers. Alternatively, one or more internal compartments may be formed between the first and second film layer, on or more internal compartments between the second and third film layer, and one or more internal compartments between the third and fourth film layer, creating a three layer water soluble unit dose article accordingly.

Figure 1:
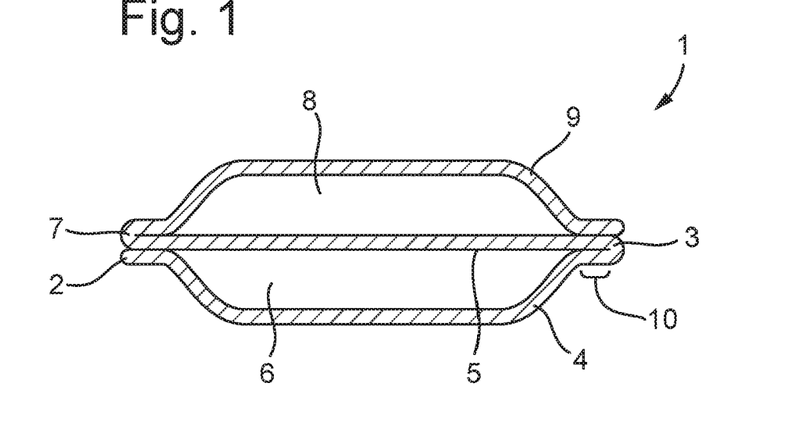
FIG. 1 is a cross-sectional view of a unit dose article according to the present invention

FIG. 1 shows a cross-section of a water-soluble unit dose article (1) according to the present invention. The water-soluble film (2) is folded at fold line (3) to create a first film layer (4) and a second film layer (5) defining a first internal compartment (6). The water-soluble film (2) is folded at a second fold line (7) to define a second internal compartment (8). The second internal compartment (8) is superposed on the first internal compartment (6). The first water-soluble film layer (4), the second water-soluble film layer (5) and the third water-soluble film layer (9) are all sealed together in the flange area (10).

Figure 2:
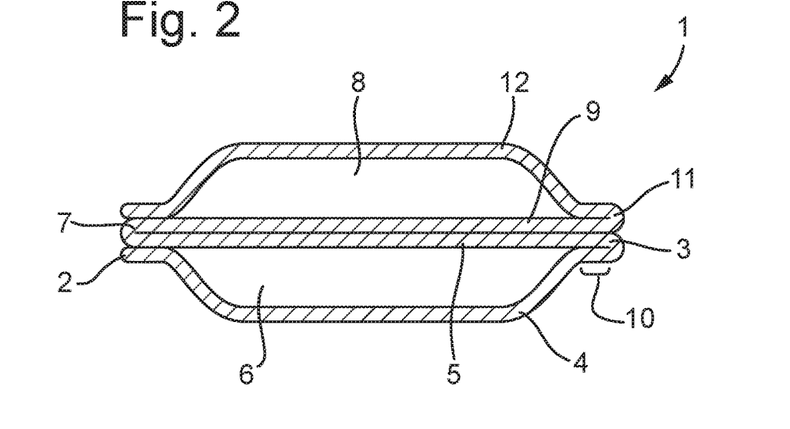
FIG. 2 is a cross-sectional view of an alternative water-soluble unit dose article according to the present invention.

FIG. 2 shows a cross-section of a water-soluble unit dose article (1) according to the present invention. The water-soluble film (2) is folded at fold line (3) to create a first film layer (4) and a second film layer (5) defining a first internal compartment (6). The water-soluble film (2) is folded at a second fold line (7) so that the second film layer (5) and third film layer (9) are in contact with one another. The water-soluble film (2) is folded at a third fold line (11) to create a fourth film layer (12) wherein the second internal compartment (8) is defined between the third film layer (9) and fourth film layer (12). The second internal compartment (8) is superposed on the first internal compartment (6). The first water-soluble film layer (4), the second water-soluble film layer (5), the third water-soluble film layer (9) and fourth water-soluble film layer (12) are all sealed together in the flange area (10).

Figure 3:
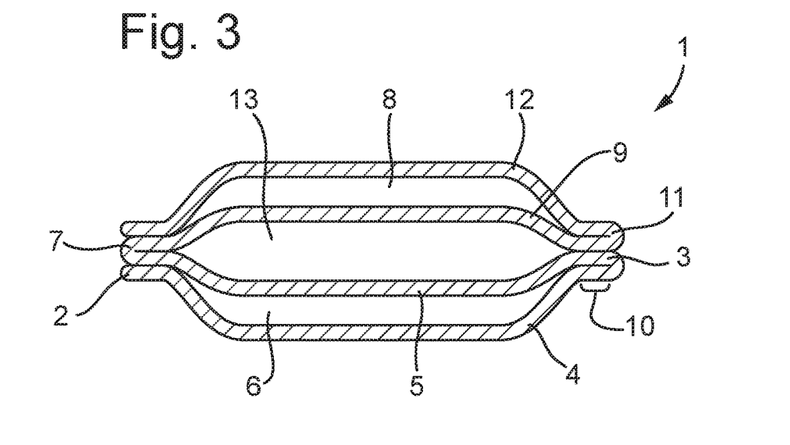
FIG. 3 is a cross-sectional view of yet a further alternative water-soluble unit dose article according to the present invention.

FIG. 3 shows a cross-section of a water-soluble unit dose article (1) according to FIG. 2. However, a further internal compartment (13) is positioned between the second water-soluble film layer (5) and the third water-soluble film layer (9).

FIGS. 1-3 illustrative only of the present invention and are not limiting in terms of water-soluble unit dose article or process of manufacture.

Water-Soluble Film

The water-soluble film of the present invention is soluble or dispersible in water. The water-soluble film preferably has a thickness of 20 microns to 150 microns, preferably 35 microns to 125 microns, even more preferably 50 microns to 110 microns, most preferably about 76 microns. By film thickness we herein mean the thickness of the starting single water-soluble film prior to unit dose article making.

Preferably, the water-soluble film has a water-solubility of at least 50%, preferably at least 75% or even at least 95%, as measured by the method set out here after using a glass-filter with a maximum pore size of 20 microns:

5 grams±0.1 gram of film material is added in a pre-weighed 3 L beaker and 2 L±5 ml of distilled water is added. This is stirred vigorously on a magnetic stirrer, Labline model No. 1250 or equivalent and 5 cm magnetic stirrer, set at 600 rpm, for 30 minutes at 30° C. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersability can be calculated.

Without wishing to be bound by theory, the term "homopolymer" generally includes polymers having a single type of monomeric repeating unit (e.g., a polymeric chain consisting of or consisting essentially of a single monomeric repeating unit). For the particular case of polyvinylalcohol, the term "homopolymer" further includes copolymers having a distribution of vinyl alcohol monomer units and optionally vinyl acetate monomer units, depending on the degree of hydrolysis (e.g., a polymeric chain consisting of or consisting essentially of vinyl alcohol and vinyl acetate monomer units). In the limiting case of 100% hydrolysis, a polyvinylalcohol homopolymer can include a true homopolymer having only vinyl alcohol units.

Without wishing to be bound by theory, the term "copolymer" generally includes polymers having two or more types of monomeric repeating units (e.g., a polymeric chain consisting of or consisting essentially of two or more different monomeric repeating units, whether as random copolymers, block copolymers, etc.). For the particular case of polyvinylalcohol, the term "copolymer" (or "polyvinylalcohol copolymer") further includes copolymers having a distribution of vinyl alcohol monomer units and vinyl acetate monomer units, depending on the degree of hydrolysis, as well as at least one other type of monomeric repeating unit (e.g., a ter- (or higher) polymeric chain consisting of or consisting essentially of vinyl alcohol monomer units, vinyl acetate monomer units, and one or more other monomer units, for example anionic monomer units). In the limiting case of 100% hydrolysis, a polyvinylalcohol copolymer can include a copolymer having vinyl alcohol units and one or more other monomer units, but no vinyl acetate units.

The water-soluble film comprises a first polyvinyl alcohol copolymer wherein said first polyvinyl alcohol copolymer comprises a first anionic monomer unit, a vinyl alcohol monomer unit, and optionally a vinyl acetate monomer unit. Preferably, first polyvinyl alcohol copolymer comprises a vinyl acetate monomer unit. The anionic monomer unit comprises an anionic moiety. General classes of anionic monomer units which can be used for the first polyvinyl alcohol co-polymer include the vinyl polymerization units corresponding to monocarboxylic acid vinyl monomers, their esters and anhydrides, dicarboxylic monomers having a polymerizable double bond, their esters and anhydrides, vinyl sulfonic acid monomers, and alkali metal salts of any of the foregoing. Examples of suitable anionic monomer units include the vinyl polymerization units corresponding to vinyl anionic monomers including vinyl acetic acid, maleic acid, monoalkyl maleate, dialkyl maleate, monomethyl maleate, dimethyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sufoethyl acrylate, alkali metal salts of the foregoing (e.g., sodium, potassium, or other alkali metal salts), esters of the foregoing (e.g., methyl, ethyl, or other C1-C4 or C6 alkyl esters), and combinations thereof (e.g., multiple types of anionic monomers or equivalent forms of the same anionic monomer). The anionic monomer may be one or more acrylamido methylpropanesulfonic acids (e.g., 2-acrylamido-1-methylpropanesulfonic acid, 2-acrylamido-2-methylpropanesulfonic acid, 2-methylacrylamido-2-methylpropanesulfonic acid), alkali metal salts thereof (e.g., sodium salts), and combinations thereof. Preferably, the anionic moiety of the first anionic monomer unit is selected from a sulphonate, a carboxylate, or a mixture thereof, more preferably a carboxylate, most preferably an acrylate, a methacrylate, a maleate, or a mixture thereof.

Preferably, the first anionic monomer unit is present in the first polyvinyl alcohol copolymer in an average amount in a range of between 1 mol. % and 10 mol. %, preferably between 2 mol. % and 5 mol. %.

Preferably, the first polyvinyl alcohol copolymer has an average viscosity ($\mu_1$) in a range of between 4 mPa·s and 30 mPa·s, preferably between 10 mPa·s and 25 mPa·s, measured as a 4% polyvinyl alcohol copolymer solution in demineralized water at 20 degrees C. The viscosity of a polyvinyl alcohol polymer is determined by measuring a freshly made solution using a Brookfield LV type viscometer with UL adapter as described in British Standard EN ISO 15023-2:2006 Annex E Brookfield Test method. It is international practice to state the viscosity of 4% aqueous polyvinyl alcohol solutions at 20° C.

It is well known in the art that the viscosity of an aqueous water-soluble polymer solution (polyvinylalcohol or otherwise) is correlated with the weight-average molecular weight of the same polymer, and often the viscosity is used as a proxy for weight-average molecular weight. Thus, the weight-average molecular weight of the first polyvinylalcohol copolymer can be in a range of 30,000 to 175,000, or 30,000 to 100,000, or 55,000 to 80,000.

Preferably, the first polyvinyl alcohol copolymer has an average degree of hydrolysis in a range of between 75% and 99%, preferably between 80% and 95%, most preferably between 85% and 95%.

The water-soluble film may comprise a second polyvinylalcohol polymer resulting in the film comprising a polyvinyl alcohol polymer blend. The second polyvinylalcohol polymer may be selected from a polyvinyl alcohol homopolymer, a second polyvinyl alcohol copolymer wherein the second polyvinyl alcohol copolymer comprises a second anionic monomer unit, or a mixture thereof. The homopolymer should be understood to comprise only vinyl alcohol monomer units and optionally, but preferably, vinyl acetate monomer units. Preferably, the second anionic monomer unit comprises a second anionic moiety. General classes of anionic monomer units which can be used for the second polyvinyl alcohol co-polymer include the vinyl polymerization units corresponding to monocarboxylic acid vinyl monomers, their esters and anhydrides, dicarboxylic monomers having a polymerizable double bond, their esters and anhydrides, vinyl sulfonic acid monomers, and alkali metal salts of any of the foregoing. Examples of suitable anionic monomer units include the vinyl polymerization units corresponding to vinyl anionic monomers including vinyl acetic acid, maleic acid, monoalkyl maleate, dialkyl maleate, monomethyl maleate, dimethyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sufoethyl acrylate, alkali metal salts of the foregoing (e.g., sodium, potassium, or other alkali metal salts), esters of the foregoing (e.g., methyl, ethyl, or other C1-C4 or C6 alkyl esters), and combinations thereof (e.g., multiple types of anionic monomers or equivalent forms of the same anionic monomer). The anionic monomer may be one or more acrylamido methylpropanesulfonic acids (e.g., 2-acrylamido-1-methylpropanesulfonic acid, 2-acrylamido-2-methylpropanesulfonic acid, 2-methylacrylamido-2-methylpropanesulfonic acid), alkali metal salts thereof (e.g., sodium salts), and combinations thereof. Preferably, the anionic moiety of the second anionic monomer unit is selected from a sulphonate, a carboxylate, or a mixture thereof, most preferably an acrylate, a methacrylate, a maleate, an acrylamido methylpropanesulfonate, or a mixture thereof.

When present, preferably, the second anionic monomer unit is present in the second polyvinyl alcohol copolymer in an average amount in a range of between 1 mol. % and 10 mol. % preferably between 2 mol. % and 5 mol. %.

Preferably, the second polyvinyl alcohol polymer has an average viscosity (0) in a range of between 4 mPa·s and 30 mPa·s preferably between 10 mPa·s and 25 mPa·s, measured as a 4% polyvinyl alcohol polymer solution in demineralized water at 20° C. The weight-average molecular weight of the second polyvinyl alcohol polymer can be in a range of 30,000 to 175,000, or 30,000 to 100,000, or 55,000 to 80,000.

Preferably, the second polyvinyl alcohol polymer has an average degree of hydrolysis in a range of between 75% and 99% preferably between 80% and 95%, most preferably between 85% and 95%.

When the second polyvinyl alcohol polymer is also a polyvinyl alcohol copolymer comprising an anionic monomer unit, the second polyvinylalcohol copolymer is different to the first polyvinylalcohol copolymer. By "different" we mean the first polyvinylalcohol copolymer and the second polyvinylalcohol have different anionic monomer unit chemistry, or, when the same anionic monomer unit, have different targeted averages during their respective manufacturing processes. In other words each polymer is intended to have at least one characteristic different to that of the other polymer. This characteristic is selected from average anionic monomer unit content, average copolymer solution viscosity, average degree of hydrolysis, or mixtures thereof. 'Targeted averages' takes into consideration the standard polymer variation inherent to any manufacture process.

Preferably, the water-soluble film comprises a polyvinylalcohol polymer blend of two different polymers preferably in a weight ratio of from 90/10 to 10/90 preferably from 80/20 to 20/80, most preferably from 70/30 to 30/70 by weight of total polyvinyl alcohol polymer present in the water-soluble film.

An especially suitable polyvinyl alcohol copolymer is the carboxylated polyvinyl alcohol copolymer used in M8630 water soluble film, as commercially available from the MonoSol company. Alternative commercially available suitable films are available from Nippon Gohsei, Sekisui, or Aicello.

The water-soluble film can contain auxiliary agents and processing agents, such as, but not limited to plasticizers, plasticizer compatibilizers, surfactants, lubricants, release agents, fillers, extenders, cross-linking agents, antiblocking agents, antioxidants, detackifying agents, antifoams, nanoparticles such as layered silicate-type nanoclays (e.g., sodium montmorillonite), bleaching agents (e.g., sodium metabisulfite, sodium bisulfite or others), aversive agents such as bitterants (e.g., denatonium salts such as denatonium benzoate, denatonium saccharide, and denatonium chloride; sucrose octaacetate; quinine; flavonoids such as quercetin and naringen; and quassinoids such as quassin and brucine) and pungents (e.g., capsaicin, piperine, allyl isothiocyanate, and resinferatoxin), and other functional ingredients, in amounts suitable for their intended purposes.

Preferably, the water-soluble film comprises one or more plasticizers in an amount in a range of between 5% and 50%, preferably between 10% and 40%, most preferably between 20% and 30% by weight of the water-soluble film. Suitable plasticisers include those selected from polyols, sugar alcohols, or a mixture thereof. Suitable polyols include polyols selected from the group consisting of glycerol, diglycerin, ethylene glycol, diethylene glycol, triethyleneglycol, tetraethylene glycol, polyethylene glycols up to 400 MW, neopentyl glycol, 1,2-propylene glycol, 1,3-propanediol, dipropylene glycol, polypropylene glycol, 2-methyl-1,3-propanediol, trimethylolpropane and polyether polyols, or a mixture thereof. Suitable sugar alcohols include sugar alcohols selected from the group consisting of isomalt, maltitol, sorbitol, xylitol, erythritol, adonitol, dulcitol, pentaerythritol and mannitol, or a mixture thereof. A preferred plasticizer is glycerin, sorbitol, triethyleneglycol, 1,2-propylene glycol, dipropylene glycol, 2-methyl-1,3-propanediol, trimethylolpropane, or a combination thereof. One particularly suitable plasticizer system includes a blend of glycerol, sorbitol and trimethylol propane. Another particularly suitable plasticizer system includes a blend of glycerin, dipropylene glycol, and sorbitol.

Preferably, the water-soluble film comprises a surfactant. Suitable surfactants can include the nonionic, cationic, anionic and zwitterionic classes. Suitable surfactants include, but are not limited to, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), and amine oxides, N-alkylbetaines and sulfobetaines (zwitterionics). Other suitable surfactants include dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations thereof. Preferably, the amount of surfactant in any individual water-soluble film is in a range of from 0.1% to 2.5%, preferably from 1% to 2% by weight of the water-soluble film.

Preferably, the water-soluble film comprises lubricants/release agents. Suitable lubricants/release agents can include, but are not limited to, fatty acids and their salts, fatty alcohols, fatty esters, fatty amines, fatty amine acetates and fatty amides. Preferred lubricants/release agents are fatty acids, fatty acid salts, and fatty amine acetates. the amount of lubricant/release agent in each individual water-soluble film is in a range of from 0.02% to 1.5%, preferably from 0.1% to 1% by weight of the water-soluble film.

Preferably, the water-soluble film comprises fillers, extenders, antiblocking agents, detackifying agents or a mixture thereof. Suitable fillers, extenders, antiblocking agents, detackifying agents or a mixture thereof include, but are not limited to, starches, modified starches, crosslinked polyvinylpyrrolidone, crosslinked cellulose, microcrystalline cellulose, silica, metallic oxides, calcium carbonate, talc and mica. Preferred materials are starches, modified starches and silica. Preferably, the amount of filler, extender, antiblocking agent, detackifying agent or mixture thereof in any individual water-soluble film is in a range of from 0.1% to 25%, preferably from 1% to 10%, more preferably from 2% to 8%, most preferably from 3% to 5% by weight of an individual water-soluble film. In the absence of starch, one preferred range for a suitable filler, extender, antiblocking agent, detackifying agent or mixture thereof is from 0.1% to 1%, preferably 4%, more preferably 6%, even more preferably from 1% to 4%, most preferably from 1% to 2.5%, by weight the water-soluble film.

Preferably, the water-soluble film has a residual moisture content of at least 4%, more preferably in a range of from 4% to 15%, even more preferably of from 5% to 10% by weight of the film, as measured by Karl Fischer titration.

Preferably, the water-soluble film comprises an aversive agent, preferably a bittering agent. Suitable bittering agents include, but are not limited to, naringin, sucrose octaacetate, quinine hydrochloride, denatonium benzoate, or mixtures thereof. Any suitable level of aversive agent may be used in the film. Suitable levels include, but are not limited to, 1 ppm to 5000 ppm, or even 100 ppm to 2500 ppm, or even 250 ppm to 2000 rpm.

The water-soluble film may be opaque, transparent or translucent. The water-soluble film may comprise a printed area. The area of print may be achieved using standard techniques, such as flexographic printing or inkjet printing.

The water-soluble film or water-soluble unit dose article or both may be coated in a lubricating agent. Preferably, the lubricating agent is selected from talc, zinc oxide, silicas, siloxanes, zeolites, silicic acid, alumina, sodium sulphate, potassium sulphate, calcium carbonate, magnesium carbonate, sodium citrate, sodium tripolyphosphate, potassium citrate, potassium tripolyphosphate, calcium stearate, zinc stearate, magnesium stearate, starch, modified starches, clay, kaolin, gypsum, cyclodextrins or mixtures thereof.

Method of Making Film

The water-soluble film may be formed by admixing, co-casting, or welding the first polyvinyl alcohol copolymer and optionally the second polyvinyl alcohol polymer according to the types and amounts described herein, together with the preferred and optional secondary additives described herein. If the polymers are first admixed then the water-soluble film is preferably formed by casting the resulting admixture (e.g., along with other plasticizers and other additives) to form a film. If the polymers are welded, the water-soluble film can be formed by, for example, solvent or thermal welding. Another contemplated class of embodiments is characterized by the water-soluble film being formed by extrusion, for example, blown extrusion. Most preferably the water soluble film according to the invention is prepared by solvent casting.

Treatment Composition

The water-soluble unit dose article comprises a treatment composition. The treatment composition may be comprised within one or more than one internal compartment. Each internal compartment may comprise a treatment composition. The treatment composition in each compartment may be the same or different to another internal compartment.

The treatment composition may be selected from laundry treatment composition, dishwashing composition, hard surface treatment composition or a mixture thereof, preferably a laundry treatment composition, more preferably a laundry treatment composition selected from laundry detergent composition, laundry softening composition, laundry freshness composition or a mixture thereof, preferably a laundry detergent composition. Preferred laundry and automatic dishwashing detergent compositions are described in more detail below.

Automatic Dishwashing Detergent Composition

The treatment composition may be an automatic dish washing composition comprising an ingredient selected from surfactant, builder, sulfonated/carboxylated polymer, silicone suds suppressor, silicate, metal and/or glass care agent, enzyme, bleach, bleach activator, bleach catalyst, source of alkalinity, perfume, dye, solvent, filler and mixtures thereof.

A preferred surfactant for use in automatic dishwashing detergents is low foaming by itself or in combination with other components (e.g. suds suppressers). Preferred for use herein are low and high cloud point nonionic surfactants and mixtures thereof including nonionic alkoxylated surfactants (especially ethoxylates derived from $C_6$-$C_{18}$ primary alcohols), ethoxylated-propoxylated alcohols (e.g., Olin Corporation's POLY-TERGENT® SLF18), epoxy-capped poly(oxyalkylated) alcohols (e.g., Olin Corporation's POLY-TERGENT® SLF18B, ether-capped poly(oxyalkylated) alcohol surfactants, and block polyoxyethylene-polyoxypropylene polymeric compounds such as PLURONIC®, REVERSED PLURONIC®, and TETRONIC® series by the BASF-Wyandotte Corp., Wyandotte, Mich.; amphoteric surfactants such as the $C_{12}$-$C_{20}$ alkyl amine oxides (preferred amine oxides for use herein include lauryldimethyl amine oxide and hexadecyl dimethyl amine oxide), and alkyl amphocarboxylic surfactants such as MIRANOL™ C2M; and zwitterionic surfactants such as the betaines and sultaines; and mixtures thereof. Surfactants can be present at a level of from 0.2% to 30% by weight, more preferably from 0.5% to 10% by weight, most preferably from 1% to 5% by weight of a detergent composition.

Builders suitable for use in the detergent composition described herein include water-soluble builders, including citrates, carbonates, silicate and polyphosphates, e.g. sodium tripolyphosphate and sodium tripolyphosphate hexahydrate, potassium tripolyphosphate and mixed sodium and potassium tripolyphosphate salts.

Enzymes suitable for use in the detergent composition described herein include bacterial and fungal cellulases including CAREZYME® and CELLUZYME® (Novo Nordisk A/S); peroxidases; lipases including AMANO-P® (Amano Pharmaceutical Co.), M1 LIPASE® and LIPOMAX® (Gist-Brocades) and LIPOLASE® and LIPOLASE ULTRA® (Novo); cutinases; proteases including ESPERASE®, ALCALASE®, DURAZYM® and SAVINASE® (Novo) and MAXATASE®, MAXACAL®, PROPERASE® and MAXAPEM® (Gist-Brocades); α and β amylases including PURAFECT® OX AM (Genencor) and TERMAMYL®, BAN®, FUNGAMYL®, DURAMYL®, and NATALASE® (Novo); pectinases; and mixtures thereof. Enzymes can be added herein as prills, granulates, or cogranulates at levels typically in the range from 0.0001% to 2% pure enzyme by weight of the cleaning composition.

Suds suppressers suitable for use in the detergent composition described herein include nonionic surfactants having a low cloud point. "Cloud point" as used herein, is a well known property of nonionic surfactants which is the result of the surfactant becoming less soluble with increasing temperature, the temperature at which the appearance of a second phase is observable is referred to as the "cloud point." As used herein, a "low cloud point" nonionic surfactant is defined as a nonionic surfactant system ingredient having a cloud point of less than 30° C., preferably less than about 20° C., and even more preferably less than about 10° C., and most preferably less than about 7.5° C. Low cloud point nonionic surfactants can include nonionic alkoxylated surfactants, especially ethoxylates derived from primary alcohol, and polyoxypropylene/polyoxyethylene/polyoxypropylene (PO/EO/PO) reverse block polymers. Also, such low cloud point nonionic surfactants can include, for example, ethoxylated-propoxylated alcohol (e.g., BASF POLY-TERGENT® SLF18) and epoxy-capped poly(oxyalkylated) alcohols (e.g., BASF POLY-TERGENT® SLF18B series of nonionics.

Other suitable components for use in the detergent composition described herein include cleaning polymers having anti-redeposition, soil release or other detergency properties. Anti-redeposition polymers for use herein include acrylic acid containing polymers such as SOKALAN® PA30, PA20, PA15, PA10 and SOKALAN® CP10 (BASF GmbH), ACUSOL® 45N, 480N, 460N (Rohm and Haas), acrylic acid/maleic acid copolymers such as SOKALAN® CP5, and acrylic/methacrylic copolymers. Other suitable polymers include amine-based polymers such as alkoxylated polyalkyleneimines (e.g., PEI600 EO20 and/or ethoxysulfated hexamethylene diamine dimethyl quats), which, optionally, may be quaternized. Soil release polymers for use herein include alkyl and hydroxyalkyl celluloses, polyoxyethylenes, polyoxypropylenes and copolymers thereof, and nonionic and anionic polymers based on terephthalate esters of ethylene glycol, propylene glycol and mixtures thereof.

Heavy metal sequestrants and crystal growth inhibitors are also suitable for use in the detergent, for example diethylenetriamine penta(methylene phosphonate), ethylenediamine tetra(methylene phosphonate) hexamethylenediamine tetra(methylene phosphonate), ethylene diphosphonate, hydroxy-ethylene-1,1-diphosphonate, nitrilotriacetate, ethylenediaminotetracetate, ethylenediamine-N,N'-disuccinate in their salt and free acid forms.

Suitable for use in the detergent composition described herein is also a corrosion inhibitor, for example organic silver coating agents (especially paraffins such as WINOG® 70 sold by Wintershall, Salzbergen, Germany), nitrogen-containing corrosion inhibitor compounds (for example benzotriazole and benzimadazole and Mn(II) compounds, particularly Mn(II) salts of organic ligands.

Other suitable components for use in the detergent composition herein include enzyme stabilizers, for example calcium ion, boric acid and propylene glycol.

Suitable rinse additives are known in the art. Commercial rinse aids for dishwashing typically are mixtures of low-foaming fatty alcohol polyethylene/polypropylene glycol ethers, solubilizers (for example cumene sulfonate), organic acids (for example citric acid) and solvents (for example ethanol). The function of such rinse aids is to influence the interfacial tension of the water in such a way that it is able to drain from the rinsed surfaces in the form of a thin coherent film, so that no water droplets, streaks, or films are left after the subsequent drying process.

Laundry Detergent Composition

The laundry detergent composition may be a powder, a liquid or a mixture thereof, preferably a liquid.

The term 'liquid laundry detergent composition' refers to any laundry detergent composition comprising a liquid capable of wetting and treating a fabric, and includes, but is not limited to, liquids, gels, pastes, dispersions and the like. The liquid composition can include solids or gases in suitably subdivided form, but the liquid composition excludes forms which are non-fluid overall, such as tablets or granules.

By powder we herein mean the laundry detergent composition may comprise solid particulates or may be a single homogenous solid. Preferably, the powder laundry detergent composition comprises particles. This means the powder laundry detergent composition comprises individual solid particles as opposed to the solid being a single homogenous solid. The particles may be free-flowing or may be compacted, preferably free-flowing.

The laundry detergent composition can be used in a fabric hand wash operation or may be used in an automatic machine fabric wash operation, preferably an automatic machine fabric wash operation.

Preferably, the laundry detergent composition comprises a non-soap surfactant. The non-soap surfactant is preferably selected from non-soap anionic surfactant, non-ionic surfactant or a mixture thereof. Preferably, the laundry detergent composition comprises between 10% and 60%, more preferably between 20% and 55% by weight of the laundry detergent composition of the non-soap surfactant.

Preferably, the anionic non-soap surfactant comprises linear alkylbenzene sulphonate, alkyl sulphate, alkoxylated alkyl sulphate, or a mixture thereof. Preferably, the alkoxylated alkyl sulphate is an ethoxylated alkyl sulphate.

Preferably, the laundry detergent composition comprises between 5% and 60%, preferably between 15% and 55%, more preferably between 25% and 50%, most preferably between 30% and 45% by weight of the detergent composition of the non-soap anionic surfactant.

Preferably, the non-soap anionic surfactant comprises linear alkylbenzene sulphonate and alkoxylated alkyl sulphate, wherein the ratio of linear alkylbenzene sulphonate to alkoxylated alkyl sulphate preferably the weight ratio of linear alkylbenzene sulphonate to ethoxylated alkyl sulphate is from 1:10 to 10:1, preferably from 6:1 to 1:6, more preferably from 4:1 to 1:4, even more preferably from 3:1 to 1:1. Alternatively the weight ratio of linear alkylbenzene sulphonate to ethoxylated alkyl sulphate is from 1:2 to 1:4. The alkoxylated alkyl sulphate can be derived from a synthetic alcohol or a natural alcohol, or from a blend thereof, pending the desired average alkyl carbon chain length and average degree of branching. Preferably, the synthetic alcohol is made following the Ziegler process, OXO-process, modified OXO-process, the Fischer Tropsch process, Guerbet process or a mixture thereof. Preferably, the naturally derived alcohol is derived from natural oils, preferably coconut oil, palm kernel oil or a mixture thereof.

Preferably, the laundry detergent composition comprises between 0% and 15%, preferably between 0.01% and 12%, more preferably between 0.1% and 10%, most preferably between 0.15% and 7% by weight of the laundry detergent composition of a non-ionic surfactant. The non-ionic surfactant is preferably selected from alcohol alkoxylate, Ziegler-synthesized alcohol alkoxylate, an oxo-synthesized alcohol alkoxylate, Guerbet alcohol alkoxylates, alkyl phenol alcohol alkoxylates or a mixture thereof.

Preferably, the laundry preferably liquid laundry detergent composition comprises between 1.5% and 20%, more preferably between 2% and 15%, even more preferably between 3% and 10%, most preferably between 4% and 8% by weight of the laundry detergent composition of soap, preferably a fatty acid salt, more preferably an amine neutralized fatty acid salt, wherein preferably the amine is an alkanolamine more preferably selected from monoethanolamine, diethanolamine, triethanolamine or a mixture thereof, more preferably monoethanolamine Preferably, the laundry detergent composition comprises a non-aqueous solvent, preferably wherein the non-aqueous solvent is selected from 1,2-propanediol, dipropylene glycol, tripropyleneglycol, glycerol, sorbitol, polypropylene glycol or a mixture thereof, preferably wherein the polypropyleneglycol has a molecular weight of 400. Preferably the liquid laundry detergent composition comprises between 10% and 40%, preferably between 15% and 30% by weight of the liquid laundry detergent composition of the non-aqueous solvent. Without wishing to be bound by theory the non-aqueous solvents ensure appropriate levels of film plasticization so the film is not too brittle and not too 'floppy'. Without wishing to be bound by theory, having the correct degree of plasticization will also facilitate film dissolution when exposed to water during the wash process.

Preferably, the liquid laundry detergent composition comprises between 0.5% and 15%, preferably between 5% and 13% by weight of the liquid laundry detergent composition of water.

Preferably, the laundry detergent composition comprises an ingredient selected from the list comprising cationic polymers, polyester terephthalates, amphiphilic graft co-polymers, carboxymethylcellulose, enzymes, perfumes, encapsulated perfumes, bleach or a mixture thereof.

The laundry detergent composition may comprise an adjunct ingredient, wherein the adjunct ingredient is selected from ethanol, ethyleneglycol, polyethyleneglycol, hueing dyes, aesthetic dyes, enzymes, builders preferably citric acid, chelants, cleaning polymers, dispersants, dye transfer inhibitor polymers, fluorescent whitening agent, opacifier, antifoam, preservatives, anti-oxidants, or a mixture thereof. Preferably the chelant is selected from aminocarboxylate chelants, aminophosphonate chelants, or a mixture thereof.

Preferably, the laundry detergent composition has a pH between 6 and 10, more preferably between 6.5 and 8.9, most preferably between 7 and 8, wherein the pH of the laundry detergent composition is measured as a 10% dilution in demineralized water at 20° C.

The liquid laundry detergent composition may be Newtonian or non-Newtonian. Preferably, the liquid laundry detergent composition is non-Newtonian. Without wishing to be bound by theory, a non-Newtonian liquid has properties that differ from those of a Newtonian liquid, more specifically, the viscosity of non-Newtonian liquids is dependent on shear rate, while a Newtonian liquid has a constant viscosity independent of the applied shear rate. The decreased viscosity upon shear application for non-Newtonian liquids is thought to further facilitate liquid detergent dissolution. The liquid laundry detergent composition described herein can have any suitable viscosity depending on factors such as formulated ingredients and purpose of the composition. When Newtonian the composition may have a viscosity value, at a shear rate of 20 s-1 and a temperature of 20° C., of 100 to 3,000 cP, alternatively 200 to 2,000 cP, alternatively 300 to 1,000 cP, following the method described herein. When non-Newtonian, the composition may have a high shear viscosity value, at a shear rate of 20 s-1 and a temperature of 20° C., of 100 to 3,000 cP, alternatively 300 to 2,000 cP, alternatively 500 to 1,000 cP, and a low shear viscosity value, at a shear rate of 1 s−1 and a temperature of 20° C., of 500 to 100,000 cP, alternatively 1000 to 10,000 cP, alternatively 1,300 to 5,000 cP, following the method described herein. Methods to measure viscosity are known in the art. According to the present disclosure, viscosity measurements are carried out using a rotational rheometer e.g. TA instruments AR550. The instrument includes a 40 mm 2° or 1° cone fixture with a gap of around 50-60μη for isotropic liquids, or a 40 mm flat steel plate with a gap of 1000 μη for particles containing liquids. The measurement is carried out using a flow procedure that contains a conditioning step, a peak hold and a continuous ramp step. The conditioning step involves the setting of the measurement temperature at 20° C., a pre-shear of 10 seconds at a shear rate of 10 s1, and an equilibration of 60 seconds at the selected temperature. The peak hold involves applying a shear rate of 0.05 s1 at 20° C. for 3 min with sampling every 10 s. The continuous ramp step is performed at a shear rate from 0.1 to 1200 s1 for 3 min at 20° C. to obtain the full flow profile.

Process of Making

A further aspect of the present invention is a process for making a water-soluble unit dose article according to the present invention comprising the steps of;
- a. Moving the single water-soluble film in a first direction;
- b. Deforming a first part of the water-soluble film to create a first open compartment comprising a first film layer;
- c. Filling the first open compartment with a treatment composition;
- d. Folding a second part of the water-soluble film in a second direction, wherein the second direction is perpendicular to the first direction, to create a second film layer which closes the open compartment to create a first closed compartment;
- e. Sealing the first and second film layers;
- f. Deforming a third part of the water-soluble film to create a second open compartment, wherein the second open compartment is positioned adjacent to the first closed compartment in the second direction;
- g. Filling the second open compartment with a treatment composition;
- h. Folding the water-soluble film in the second direction so that the first closed compartment is folded to close the second open compartment creating a third film layer;
- i. Sealing the third film layer to the sealed first and second film layers to create the water-soluble unit dose article.

wherein each of steps a-i happen sequentially, or wherein steps f and b happen simultaneously and steps c and g happen simultaneously, or wherein step f happens before step b and step g happens before step c, or a combination thereof.

The above process creates a superposed water-soluble unit dose article comprising 3 layers of water-soluble film.

An alternative process can be used to create a superposed water-soluble unit dose article comprising 4 layers of water-soluble film. Therefore, a process for making a water-soluble unit dose article according to the present invention may comprise the steps of;
- a. Moving the water-soluble film in a first direction;
- b. Deforming a first part of the water-soluble film to create a first open compartment comprising a first film layer;
- c. Filling the first open compartment with a treatment composition;
- d. Folding a second part of the water-soluble film in a second direction, wherein the second direction is perpendicular to the first direction, to create a second film layer which closes the open compartment to create a first closed compartment;
- e. Sealing the first and second film layers together;
- f. Deforming a third part of the water-soluble film to create a second open compartment comprising a third film layer, wherein the second open compartment is positioned adjacent to the first closed compartment in the second direction;
- g. Filling the second open compartment with a treatment composition;
- h. Folding a fourth part of the water-soluble film in a third direction, wherein the third direction is opposite to the first direction to create a fourth film layer which closes the open second compartment to a create a second closed compartment;
- i. Sealing the third and fourth film layers together;
- j. Folding the water-soluble film in the second direction or the third direction so that the first and second closed compartments are positioned so that the first and second closed compartments are in superposed orientation to one another;
- k. Sealing the sealed third and fourth film layers to the sealed first and second film layers to create the water-soluble unit dose article, wherein steps a-k can happen sequentially, or wherein steps b-e and f-i may occur simultaneously to one another, or where steps f-i occur before steps b-e, or a mixture thereof.

Process of Using

A further aspect of the present invention is a method of washing comprising the steps of adding the water-soluble unit dose article according to the present invention to sufficient water to dilute the laundry detergent composition by a factor of at least 200 fold, preferably between 250 and 3000 fold, more preferably between 250 and 1500 fold, most preferably between 500 and 1500 fold to create a wash liquor and contacting articles to be washed with said wash liquor.

Without wishing to be bound by theory, when the water-soluble unit dose article is added to water, the water-soluble film dissolves releasing the internal treatment composition into the water. The treatment composition disperses in the water to create the wash liquor.

Preferably the wash liquor may comprise between 10 L and 75 L, preferably between 20 L and 70 L, more preferably between 30 L and 65 L of water.

Preferably, the wash liquor is at a temperature of between 5° C. and 90° C., preferably between 10° C. and 60° C., more preferably between 12° C. and 45° C., most preferably between 15° C. and 40° C.

Preferably, washing the fabrics in the wash liquor takes between 5 minutes and 50 minutes, preferably between 5 minutes and 40 minutes, more preferably between 5 minutes and 30 minutes, even more preferably between 5 minutes and 20 minutes, most preferably between 6 minutes and 18 minutes to complete.

When using as a laundry detergent, preferably, the wash liquor comprises between 1 kg and 20 kg, preferably between 5 kg and 20 kg, most preferably between 10 and 20 kg of fabrics.

The wash liquor may comprise water of any hardness preferably varying between 0 gpg to 40 gpg.

EXAMPLES

The cold water solubility profile of 3 different polyvinyl alcohol based water soluble films has been determined following the MSTM205 Disintegration/Dissolution protocol, executed in 20° C. demineralized water.

Film Materials:

3 different film samples (76 micron thickness each) were obtained from the MonoSol company:
- Film 1: M8630—commercial film comprising polyvinyl alcohol/monocarboxylate copolymer resin (according to the claims of the present invention).
- Film 2: film comprising 60/40-70/30 blend of a polyvinyl alcohol homopolymer (13-23 cps, dH: 85-87%)/polyvinyl alcohol-maleate copolymer (15-20 cps, dH: 89-91%, 4% maleate by weight of copolymer)-total resin presence: 64-66% by weight of water soluble film (according to the claims of the present invention)
- Comparative film A: film comprising 50/50 blend of two polyvinyl alcohol homopolymers (13 cps & 23 cps respectively, dH: 85-88%, total resin presence: 66% by weight of water soluble film)

All films comprised about 22-24% of a plasticizer system and about 6-7% of water, balancing the remainder to 100% with commonly used water soluble film additives.

3 and 4 film samples of each test film were respectively sealed together through solvent sealing, e.g. demineralized water at room temperature as sealing solvent, using an anilox roller, to generate a 3 and a 4 layer thick film respectively mimicking a 3 or 4 film layer seal area of a water soluble unit dose article.

Test Results:

The table below summarizes the time of film breakage and time of full film dissolution for the different test films, both for 3 and for 4 film layer seals. From the data it can clearly be seen that water soluble films comprising a polyvinyl alcohol copolymer comprising an anionic monomer unit according to the invention (Films 1 and 2) are superior in view of cold water film dissolution compared to a water soluble film outside the scope of the invention lacking a polyvinyl alcohol copolymer comprising an anionic monomer unit (Comparative film A). Film dissolution time of 4 film layers sealed together of inventive film 1 composition even matches the film dissolution time of 3 film layers sealed together of comparative film A. From the table it can also be seen that film dissolution worsens disproportionately with number of film layers sealed together, e.g. while when shifting from 3 to 4 sealed films (33% film thickness increase), the film dissolution time is delayed with about 70%, highlighting the increasing need for proper film chemistry selection upon increased number of sealed film layers in order to control seal dissolution hence film residue on fabric issues through the wash.

|  | Film breakage time (seconds) | Film dissolution time (seconds) |
| --- | --- | --- |
| Inventive film 1 (4 films) | 228 | 387 |
| Inventive film 2 (4 films) | 263 | 483 |
| Comparative film A (4 films) | 345 | 650 |
| Inventive film 1 (3 films) | 152 | 245 |
| Inventive film 2 (3 films) | 160 | 281 |
| Comparative film A (3 films) | 182 | 387 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

The invention claimed is:

1. A multicompartment water-soluble unit dose article comprising a treatment composition and comprising a single water-soluble film,
   wherein the single water-soluble film comprises a first polyvinyl alcohol copolymer wherein said first polyvinyl alcohol copolymer comprises a first anionic monomer unit, a vinyl alcohol monomer unit, and a vinyl acetate monomer unit, wherein said anionic monomer unit comprises an anionic moiety, and
   wherein the single water-soluble film is folded upon itself to create at least a first film layer, a second film layer and a third film layer; and
   wherein at least a first internal compartment and a second internal compartment are formed between said layers; and
   wherein the multicompartment water-soluble unit dose article comprises at least one seal region in which the first film layer, the second film layer and the third film layer are all sealed to one another, and
   wherein the first internal compartment is positioned above the second internal compartment in a superposed orientation and the first internal compartment and second internal compartment are separated from one another by at least one water-soluble film layer,
      wherein at least one of the first and/or second internal compartments comprises a treatment composition selected from laundry treatment composition, dishwashing composition, hard surface treatment composition, or a mixture thereof.

2. The water-soluble unit dose article according to claim 1, wherein the first anionic monomer unit comprises an anionic moiety selected from a sulphonate, a carboxylate, or a mixture thereof.

3. The water-soluble unit dose article according to claim 2, wherein the carboxylate, is selected from an acrylate, a methacrylate, a maleate, or a mixture thereof.

4. The water-soluble unit dose article according to claim 1 wherein the first anionic monomer unit is present in the first polyvinyl alcohol copolymer in an average amount in a range of between about 1 mol. % and about 10 mol. %.

5. The water-soluble unit dose article according to claim 1 wherein the first polyvinyl alcohol copolymer has an average viscosity ($\mu$1) in a range of between about 4 mPa·s and about 30 mPa·s, measured as a about 4% polyvinyl alcohol polymer solution in demineralized water at about 20° C.

6. The water-soluble unit dose article according to claim 5 wherein the first polyvinyl alcohol copolymer has an average viscosity ($\mu$1) in a range of between about 10m Pa·s and about 25 mPa·s, measured as a about 4% polyvinyl alcohol polymer solution in demineralized water at about 20° C.

7. The water-soluble unit dose article according to claim 1 wherein the first polyvinyl alcohol copolymer has an average degree of hydrolysis in a range of between about 75% and about 99%.

8. The water-soluble unit dose article according to claim 1 wherein the total amount of any polyvinylalcohol copolymer in the film is between about 30% and about 95% by weight of the film.

9. The water-soluble unit dose article according to claim 1, wherein the water-soluble unit dose article comprises at least three internal compartments.

10. The water-soluble unit dose article according to claim 9, wherein the water-soluble unit dose article comprises at least four internal compartments.

11. The water-soluble unit dose article according to claim 1, wherein the single water-soluble film is folded upon itself to create at least a first layer, a second layer and a third layer, wherein the first internal compartment is formed between the first layer and second layer, and the second internal compartment is formed between the second layer and third layer.

12. The water-soluble unit dose article according to claim 1, wherein the single water-soluble film is folded upon itself to create at least about four layers of film.

13. The water-soluble unit dose article according to claim 12, wherein the single water-soluble film is folded upon itself to create at least about five layers of film.

14. The water-soluble unit dose article according to claim 1 wherein the film layers are sealed together via solvent sealing, heat sealing or a mixture thereof.

15. The water-soluble unit dose article according to claim 14 wherein the solvent sealing uses a solvent that comprises about >99%, by weight of the solvent, of water.

16. The water-soluble unit dose article according to claim 1 wherein the seal region comprises a flange region, wherein the flange region comprises areas in which the first, second, and third layers are sealed together.

17. A process for making a water-soluble unit dose article according to claim 1, the process comprising the steps of:
   a. moving the single water-soluble film in a first direction;
   b. deforming a first part of the water-soluble film to create a first open compartment comprising a first film layer;
   c. filling the first open compartment with a treatment composition;
   d. folding a second part of the water-soluble film in a second direction, wherein the second direction is perpendicular to the first direction, to create a second film layer which closes the open compartment to create a first closed compartment;
   e. sealing the first and second film layers;
   f. deforming a third part of the water-soluble film to create a second open compartment, wherein the second open compartment is positioned adjacent to the first closed compartment in the second direction;
   g. filling the second open compartment with a treatment composition;
   h. folding the water-soluble film in the second direction so that the first closed compartment is folded to close the second open compartment creating a third film layer;
   i. sealing the third film layer to the sealed first and second film layers to create the water-soluble unit dose article,
wherein each of steps a-i happen sequentially, or wherein steps f and b happen simultaneously and steps c and g happen simultaneously, or wherein step f happens before step b and step g happens before step c, or a combination thereof.

18. A process for making a water-soluble unit dose article according to claim 1, the process comprising the steps of:
   a. moving the water-soluble film in a first direction;
   b. deforming a first part of the water-soluble film to create a first open compartment comprising a first film layer;
   c. filling the first open compartment with a treatment composition;
   d. folding a second part of the water-soluble film in a second direction, wherein the second direction is perpendicular to the first direction, to create a second film layer which closes the open compartment to create a first closed compartment;
   e. sealing the first and second film layers together;
   f. deforming a third part of the water-soluble film to create a second open compartment comprising a third film layer, wherein the second open compartment is positioned adjacent to the first closed compartment in the second direction;
   g. filling the second open compartment with a treatment composition;
   h. folding a fourth part of the water-soluble film in a third direction, wherein the third direction is opposite to the first direction to create a fourth film layer which closes the open second compartment to a create a second closed compartment;
   i. sealing the third and fourth film layers together;
   j. folding the water-soluble film in the second direction or the third direction so that the first and second closed compartments are positioned so that the first and second closed compartments are in superposed orientation to one another;
   k. sealing the sealed third and fourth film layers to the sealed first and second film layers to create the water-soluble unit dose article,
wherein steps a-k happen sequentially, or
wherein steps b-e and f-i occur simultaneously to one another, or
wherein steps f-i occur before steps b-e.

* * * * *